U
nited States Patent [19]
Jung

[11] 3,891,684
[45] June 24, 1975

[54] PREPARATION OF ORGANOMETALLIC COMPLEXES
[75] Inventor: Herbert A. Jung, New York, N.Y.
[73] Assignee: Exxon Research and Engineering Company, Linden, N.J.
[22] Filed: Nov. 4, 1971
[21] Appl. No.: 195,845

[52] U.S. Cl............. 260/429 R; 252/431; 260/441; 260/446
[51] Int. Cl. ............................................ C07c 15/00
[58] Field of Search..... 260/429 R, 441, 446, 439 R

[56] References Cited
UNITED STATES PATENTS

| | | | |
|---|---|---|---|
| 3,355,439 | 11/1967 | Welch et al................. | 260/439 R X |
| 3,450,730 | 6/1969 | Scheben et al................. | 252/429 R |
| 3,511,880 | 5/1970 | Booth.......................... | 252/431 P X |
| 3,573,292 | 3/1971 | Wilke et al.................. | 260/439 R X |
| 3,671,560 | 6/1972 | Fahey............................ | 260/429 R |

Primary Examiner—Paul F. Shaver
Attorney, Agent, or Firm—D. C. Caulfield

[57] ABSTRACT

A process for the preparation of palladium and platinum organometallic complexes in the zerovalent state is described. The process comprises contacting a palladium or platinum compound containing palladium or platinum ions having a valence of at least +1 with complexing ligands such as phosphines, phosphites, arsines, stibines, olefins, and the like. The contacting is carried out in the liquid phase and in the presence of an alcoholic media and in the substantial absence of oxygen preferably at elevated temperatures. The products have known utility as catalysts, for example, in butadiene dimerization reactions, additionally they are useful as catalysts for butadiene co-trimerization reactions with compounds containing an active hydrogen, as well as oxidation reactions.

15 Claims, No Drawings

PREPARATION OF ORGANOMETALLIC COMPLEXES

FIELD OF THE INVENTION

This invention relates to a process for preparing organometallic complexes of palladium and platinum in the zerovalent state. More particularly, the invention describes a method for preparing zerovalent palladium or platinum organometallic complexes by contacting compounds of the metals containing palladium or platinum ions having a valence of at least +1 with complexing ligands in the presence of an alcohol. In a preferred embodiment, the process of the invention is broadly applicable to the preparation of complexes of palladium and platinum in their zerovalent state with phosphines, arsines and stibines as well as other coordinating ligands i.e. phosphites, olefins, ethers, thioethers, amines, nitriles and isonitriles. Moreover, the process is applicable to preparing zerovalent palladium or platinum complexes containing mixtures of these various ligands. For convenience sake, further embodiments will be described herein using phosphine as the ligand but such embodiments are to be equally applicable for any ligand described above as useful.

As discussed above, it is also possible by the operation of the instant process to prepare zerovalent organometallic complexes of palladium and platinum that contain several different ligands such as aryl phosphines and alkyl phosphines or aralkyl phosphines; additionally, other coordinating ligands may be incorporated into the complexes. These other coordinating ligands as is stated include olefins, ethers, thioethers, amines, nitriles and isonitriles. These mixed ligand complexes may be more desirable as catalysts since due to their unsymmetric nature, they possess a greater solubility than the normal phosphine metal complexes.

DESCRIPTION OF THE PRIOR ART

Methods are available in the art for the preparation of palladium and platinum complexes in their zerovalent state. These methods usually comprise the preparation of a complex of a metal salt such as palladium chloride with a ligand such as triphenylphosphine and the reduction of the resulting complex, i.e., bistriphenylphosphine palladium dichloride, with a reducing agent such as hydrazine, complex hydrides, organometallic compounds, or excess phosphine to give tetrakistriphenylphosphine metal complexes (see e.g., L. Malatesta and M. Angelotta J. Chem. Soc. [London] 1957 pg. 1186). In other instances, these complexes containing the metal in the zerovalent state have been prepared from olefin complexes of the metal (see for example E. O. Fischer and H. Werner Chem. Ber. 95 703, 1962). Moreover, the preparation of these complexes has been achieved from phosphine complexes such as bistriphenylphosphine palladium dichloride, in the presence of excess phosphine and sodium n-propoxide or a secondary alcohol, a tertiary alcohol or phenols as reported in Chemica E Industria vol. 53 (4) pg. 361, 1971.

In still another way, the palladium tetrakistriphenylphosphine complexes have been prepared in an autoclave from palladium acetylacetonate or palladium acetate by reduction with hydrogen at elevated temperatures and elevated pressures in solvents such as acetic acid or ethanol and in the presence of the required amount of triphenylphosphine; such a process is taught in British Pat. No. 1,181,485.

All these prior art methods, however, suffer from the drawback that first a complex of the metal has to be prepared from a metal salt or as in British Patent 1,181,485, high pressure equipment and hydrogen must be used. Hence, it is imminently clear that this art is in need of a more direct and more efficient process for the preparation of palladium and platinum organometallic complexes in the zerovalent state.

SUMMARY OF THE INVENTION

In accordance with the present invention it has been unexpectedly found that palladium or platinum organometallic complexes in their zerovalent state can be readily prepared by contacting palladium or platinum compounds containing palladium or platinum ions having a valence of at least +1 with complexing ligands such as compunds having the formula $R_1R_2R_3L$ or coordinating ligands such as olefins, ethers, thioethers, amines, nitriles and isonitriles and mixtures thereof. The contacting is to be conducted in the liquid phase and in the presence of an alcoholic media wherein the alcohol has the formula $R(OH)_n$ and in the substantial absence of oxygen.

The compounds of palladium and platinum metals employed as starting materials in the process may broadly be described as salts, chelates and coordination compounds which contain palladium or platinum ions, having a valence of at least +1. They may be salts of weak acids as carboxylic acids, phenols or even alcohols; salts of stronger acids like palladium chloride will also yield the desired product but are not generally preferred since the resulting yields tend to be lower and further separation problems may complicate the preparation. Most preferred of the salts are the palladium and platinum acetates and acetylacetonates but in general anions of carboxylic acids in combination with the metal ion in the +1 or greater valence state will provide good starting materials.

The most preferred ligands are alkyl and aryl phosphines, arsines and stibines with mixed aliphatic and aromatic substituents, such as aralkyl and alkaryl phosphines, arsines, and stibines. The complexing ligands useful in the present invention include other coordinating ligands such as olefins, ethers and the like as described above and it is within the scope of the present invention to employ mixtures of both complexing ligands represented by the formula $R_1R_2R_3L$ and these coordinating ligands. The final zerovalent palladium or platinum complex will therefore include any and all possible combinations of these ligands. The process comprises contacting in the liquid phase and in the substantial absence of oxygen, a source of palladium or platinum ions having a valence of at least +1 with complexing ligands as described above, in an alcoholic media. The contacting may be carried out at ambient as well as elevated temperatures.

In carrying out the present process the palladium and platinum compounds employed as the starting materials as has been pointed out above, may be either platinum or palladium salts, chelates or coordination compounds. By the term salts is meant platinum or palladium salts whose anionic components are the anions of acids. Preferably when the starting palladium or platinum compound is a metal salt, the anionic component is an anion of a weak acid. Representative examples of preferred palladium and platinum salts include: palladium or platinum acetate, palladium or platinum propionates, palladium or platinum butyrates and the like. Also useful are palladium or platinum chelate materials. By chelate is meant the type of coordination compound in which the central metal atom is joined to two or more other atoms of one or more other molecules called ligands so that one or more heterocyclic rings are formed with the central metal atom as part of each ring. Usually both ordinary and coordinate bonds are involved in joining the central metal atom to the adjoining atoms in the ring but these bonds may be entirely of one or the other type. Nonlimiting examples of such chelate materials include acetylacetone, ethylene diamine and the like. Moreover, compounds generally referred to as palladium or platinum coordination compunds are also useful as starting materials. Nonlimiting representative examples of such coordination compounds include bis π-allyl palladium chloride and bis-triphenylphosphine palladium chloride and the like.

Other representative nonlimiting examples of the useful starting materials include palladium formate, palladium propionate, palladium cyanide, palladium thiocyanide, palladium carbonate, palladium cyanate, palladium 3,5-heptadionate as well as similar platinum salts.

The alcohols employed in the present process may be broadly described as alcohols having the formula $R(OH)_n$ wherein R is a substituted or unsubstituted hydrocarbyl radical. Generally, however, R is a monovalent radical having from 1 to 14 carbon atoms, selected from the group consisting of alkyl radicals, having from 1 to 12 carbon atoms, more preferably from 1 to 6 carbon atoms, most preferably from 1 to 4 carbon atoms; phenyl radicals; alkaryl radicals having from 7 to 14 carbon atoms, more preferably from 7 to 10 carbon atoms; aralkyl radicals having from 7 to 14, more preferably from 7 to 10 carbon atoms; n is an integer ranging from 1 to 3; preferably n is 1 and the alcohol is a primary or secondary alcohol having from 1 to 6 carbon atoms. Nonlimiting representative examples of useful alcohols include methanol, ethanol, isopropanol, propanol, butanol, hexanol, isobutanol, phenol, tolyl alcohol, benzyl alcohol, and the like. Also useful as solvents which may additionally be operating as reducing agents in the present process are such materials as dialcohols, and trialcohols, for example, ethylene glycol or glycerine. Finally, aldehydes in the presence of water may also be used as solvent media. Examples of aldehydes and alcohols useful in the present process include: formaldehyde, acetaldehyde, propanal and the like.

The complexing ligands useful in the present process are materials which may be generally described as co-ordinating ligands and compounds having the formula: $R_1R_2R_3L$. When materials represented by $R_1R_2R_3L$ are employed, $R_1R_2$ and $R_3$ are defined as substituted or unsubstituted hydrocarbyl moieties having from 1 to 12 carbon atoms and L is a Group VA element. Preferably though, L is phosphorous, arsenic or antimony and $R_1$, $R_2$ and $R_3$ are monovalent alkyl radicals having from 1 to 8 carbon atoms, more preferably from 1 to 5 carbon atoms, phenyl radicals, monovalent alkylaryl radicals having from 7 to 12, more preferably from 7 to 10 carbon atoms, and monovalent aralkyl radicals having from 7 to 12 and more preferably from 7 to 10 carbon atoms. By the term substituted hydrocarbyl is meant the hydrocarbyl chain may contain hetero atoms such as oxygen, nitrogen, sulfur and the like. Phosphorous ligands as described above wherein $R_1$, $R_2$ and $R_3$ are indirectly connected to the phosphorous atom through oxygen bridges may also be suitably employed. Nonlimiting representative examples of useful complexing ligands include triphenyl phosphine, tricyclohexyl phosphine, tributyl phosphine, diethylphenyl phosphine, methyldiphenyl phosphine, tris(p-tolyl)phosphine, tris-(4-methylcyclohexyl)phosphine, triethyl phosphine, tribenzyl phosphine, tris-phenylethyl phosphine. $R_1R_2R_3L$ additionally may be cyclic or bicyclic moieties. Coordinating ligands useful in the practice of the present invention include materials such as olefins, ethers, thioethers, amines, nitriles and isonitriles and the like. Without departing from the spirit of the present invention, it is possible for the complexing ligand materials to include mixtures of $R_1R_2R_3L$ and coordinating ligands such that the final zerovalent metal complex would contain any and all combinations of the ligands heretofore described.

The amount of the complexing ligands is normally the stoichiometric amount. By stoichiometric amount is meant the amount of complexing ligand sufficient to fully react all the available metal compound starting material present. For example, 4 moles of triphenylphosphine are used per mole of palladium in the preparation of tetrakis(triphenylphosphine)palladium and this amount is designated the stoichiometric amount. Preferably, however, a small excess of this amount of complexing ligand should be employed.

The process is operable at from 0°C. to ambient, i.e., room temperatures and higher and may be carried out generally between about 0°C. and about 200°C.; more preferably between about 40°C. and about 150°C., and still more preferably between 50° and 100°C. Since the tetrakis(triphenylphosphine) palladium materials and the like are attacked by oxygen, it is important in the operation of the present process that the reaction be carried out in the substantial absence of oxygen. By the substantial absence of oxygen is meant that the oxygen level in reaction vessels and in the materials, dissolved or otherwise, is low enough as to not detrimentally affect the final product in any way. This may be done conveniently by evacuating and purging the system with nitrogen or some other inert gas to remove all air from the mixture prior to the initiation of the reaction and maintaining the purged system by carrying out the reaction under a slightly positive inert gas atmosphere.

The products of the present process are known to be useful as catalysts in a number of reactions, for example, dimerization reactions of butadiene have been carried out with the use of palladium zerovalent complexes of phosphines and arsines.

DESCRIPTION OF THE PREFERRED EMBODIMENTS

The process of this invention is preferably applicable to the preparation of palladium and platinum complexes of phosphine, arsine and stibines in the zerovalent state. The starting materials are most preferably palladium or platinum acetates and acetylacetonates. The preferred ligands to be employed are the phosphines, stibines and arsines such as the triphenyl, trialkyl phosphines, arsines and stibines. The preferred alcohol is methanol, but other alcohols such as ethanol and the like may be employed.

In a typical reaction sequence, an amount of palladium acetylacetonate and the respective stoichiometric amount of triphenylphosphine are placed in a flask. The flask is then evacuated and filled with nitrogen, thereby purging all oxygencontaining air from the mixture. Into the nitrogen purged flask an amount of methanol, which has also been purged with nitrogen, is added and the entire mixture is refluxed under nitrogen for 3 hours at temperatures of 65°C. During the course of the reaction a solid precipitates which is subsequently filtered off. The remaining filtrate may then be subjected to further refluxing after which additional product may be collected.

The present invention may be illustrated but it is not necessarily limited to the following examples:

EXAMPLE 1

Into a 100 cc round bottom flask is placed 4.56 grams of (15 mmoles) palladium acetylacetonate and 19.7 grams (75 mmoles) of triphenylphosphine. The flask was evacuated and then filled with nitrogen 3 times in order to remove all air from the mixture. This mixture was then placed into a 2 liter round bottom flask which had been flushed with nitrogen. 1,350 cc of nitrogen-purged methanol was added and the mixture was kept at 65°C. under nitrogen for 3 hours. The 14.22 grams of yellow, very slightly, greenish solid which precipitated was filtered off and the filtrate subjected to two more hours at 65°C. after which an additional 1.17 grams of product was collected. The total yield of tetrakis(triphenylphosphine)palladium was 89 percent which after being dried under vacuum analyzed satisfactorily for carbon and hydrogen.

|   | Found | Theoretical |
|---|-------|-------------|
| C | 74.62% | 74.8% |
| H | 5.27% | 5.2% |

EXAMPLE 2

According to the procedure outlined in Example 1, 0.0672 g (0.3 mmole) palladium acetate, 0.314 g (1.2 mmole) triphenylphosphine and 100 cc methanol were reacted to give tetrakis(triphenylphosphine)palladium in 78 percent yield.

EXAMPLE 3

According to the procedure outlined in Example 1, 0.0912 g (0.3 mmole) palladium acetylacetonate, 0.365 g (1.2 mmole) tribenzylphosphine and 100 cc methanol gave after a 5 hour heating to 55°C., tetrakis-(tribenzylphosphine)palladium in 23 percent yield.

EXAMPLE 4

According to the procedure outlined in Example 1, 0.091 g (0.3 mmole) palladium acetylacetonate, 0.314 g (1.2 mmole) triphenylphosphine and 100 cc ethanol were heated together to 78°C. After two hours tetrakis(triphenylphosphine) palladium was isolated in 64% yield.

EXAMPLE 5

According to the procedure outlined in Example 1, 0.091 g (0.3 mmole) palladium acetylacetonate, 0.314 g (1.2 mmole) triphenylphosphine were heated to 80°C. in 100 cc isopropanol. After two hours, tetrakis(triphenylphosphine) palladium was isolated in 46% yield.

EXAMPLE 6

According to the procedure outlined in Example 1, 0.091 g (0.3 mmole) palladium acetylacetonate, 0.364 (1.2 mmole) triphenylarsine and 100 cc methanol were heated to 55°C. for 3 hours, 85 percent tetrakis(triphenylarsine)palladium was recovered from the solution by filtration.

EXAMPLE 7

According to the procedure outlined in Example 1, 1.52 g (5 mmole) palladium acetylacetonate, 7.07 g (20 mmole) triphenylstibine and 100 cc methanol were heated to 65°C. for 2 hours. 82 percent of the theoretically expected tetrakis(triphenylstibine)palladium was isolated by filtration.

EXAMPLE 8

According to the procedure outlined in Example 1, 0.1177 g (0.3 mmole) platinum acetylacetonate and 0.314 g (1.2 mmole) triphenylphosphine were heated to 65°C. in 100 cc methanol. After 2 hours 57% of the theoretically expected tetrakis(triphenylphosphine)-platinum was recovered by filtration.

EXAMPLE 9

0.304 g (1 mmole) palladium acetylacetonate and 0.524 g (2 mmole) triphenylphosphine were placed together with 20 cc methanol into a 6 oz glass pressure bottle. The pressure bottle was then charged with 30 psig ethylene. After stirring the mixture with a magnetic stirrer for 5 hours a precipitate, which as evidenced by infrared analysis contained triphenylphosphine and ethylene, appeared. 0.52 g of this triphenylphosphine-ethylene palladium complex was collected by filtration.

EXAMPLE 10

According to the procedure outlined in Example 1, 1.216 g (4 mmole) palladium acetylacetonate, and 2.59 g (16 mmole) 1-ethyl-3.5.8-trioxa-4phospha-2.2.2-bicyclooctane were reacted in methanol at room temperature. After a few minutes an off white precipitate started to appear and after 1 hour 53 percent of the theoretically expected amount of the tetrakis-bicyclic phosphite palladium was collected by filtration.

What is claimed is:

1. A method for preparing organometallic complexes in the zerovalent state which comprises contacting in the liquid phase and in the substantial absence of oxygen;

a. palladium or platinum compounds containing palladium or platinum ions having a valence of at least +1 with;

b. complexing ligands having the general formula $R_1R_2R_3L$ wherein $R_1$, $R_2$ and $R_3$ are independently selected from the group consisting of alkyl radicals having from 1 to 8 carbon atoms, phenyl radicals, alkaryl radicals having from 7 to 12 carbon atoms and aralkyl radicals having from 7 to 12 carbon atoms and L is a Group VA element, said contacting to be carried out at temperatures from 0°C. to about 200°C. and in the presence of an alcohol having the formula $R(OH)_n$ wherein n is an integer ranging from 1 to 3 and R is a monovalent radical selected from the group consisting of alkyl radicals having from 1 to 12 carbon atoms, phenyl radicals, alkaryl radicals having from 7 to 14 carbon atoms, and aralkyl radicals having from 7 to 14 carbon atoms.

2. The method of claim 1 wherein $R_1$, $R_2$ and $R_3$ are connected to L through oxygen bridges.

3. The method of claim 2 wherein said palladium or platinum compounds contain palladium or platinum ions having a valence state of +2.

4. A method of preparing organometallic complexes of palladium or platinum in a zerovalent state which comprises contacting in the liquid phase and in the substantial absence of oxygen;
   a. a palladium or platinum compound selected from the group consisting of salts, chelates and coordination compounds containing palladium or platinum ions having a valence state of at least +1 with;
   b. complexing ligands having the formula $R_1R_2R_3L$ wherein $R_1$, $R_2$ and $R_3$ are independently selected from the group consisting of alkyl radicals having from 1 to 5 carbon atoms, phenyl radicals, alkaryl radicals having from 7 to 10 carbon atoms and aralkyl radicals having from 7 to 10 carbon atoms and L is phosphorus, arsenic or antimony; said complexing ligands being present in at least the stoichiometric amount, said contacting to be carried out at a temperature in the range of from about 40°C. to about 150°C. and in the presence of an alkanol having from 1 to 12 carbon atoms.

5. The method of claim 4 wherein said palladium or platinum compound is palladium acetate, palladium acetylacetonate, platinum acetate or platinum acetylacetonate.

6. The method of claim 5 wherein $R_1$, $R_2$ and $R_3$ are phenyl radicals.

7. A method of preparing organometallic complexes in the zerovalent state which comprises contacting in the liquid phase and under an inert atmosphere;
   a. palladium or platinum salts of a weak acid wherein the palladium or platinum moiety has a valence state of at least +1 with;
   b. complexing ligands of the type having the formula $R_1R_2R_3L$ wherein $R_1$, $R_2$ and $R_3$ are independently selected from the group consisting of alkyl radicals having from 1 to 5 carbon atoms, phenyl radicals, and L is phosphorous, arsenic or antimony, said contacting to be carried out in the range of from between 50 and 100°C. and in the presence of a primary or secondary alkanol having from 1 to 6 carbon atoms.

8. The method of claim 7 wherein said palladium or platinum salt is palladium acetate or platinum acetate.

9. The method of claim 8 wherein $R_1$, $R_2$ and $R_3$ are benzyl radicals.

10. The method of claim 9 wherein said alkanol is methanol, ethanol or isopropanol.

11. The method of claim 7 wherein said palladium or platinum salt is contacted with a mixture of complexing ligands having the above defined significance.

12. A method for preparing organometallic complexes in the zerovalent state which comprises contacting in the liquid phase and in the substantial absence of oxygen;
   a. palladium or platinum compounds containing palladium or platinum ions having a valence of at least +1 with;
   b. coordinating ligands comprising olefins, said contacting to be carried out at temperatures from 0°C. to about 200°C. and in the presence of an alcohol having the formula $R(OH)_n$ wherein n is an integer ranging from 1 to 3 and R is a monovalent radical selected from the group consisting of alkyl radicals having from 1 to 12 carbon atoms, phenyl radicals, alkaryl radicals having from 7 to 14 carbon atoms and aralkyl radicals having from 7 to 14 carbon atoms.

13. The method of claim 12 wherein said coordinating ligands are employed in conjunction with complexing ligands having the formula $R_1R_2R_3L$ wherein $R_1$, $R_2$ and $R_3$ are monovalent alkyl radicals having from 1 to 8 carbon atoms, monovalent alkylaryl radicals having from 7 to 12 carbon atoms or monovalent aralkyl radicals having from 7 to 12 carbon atoms.

14. The method of claim 1 wherein R is a monovalent radical selected from the group consisting of alkyl radicals having from 1 to 6 carbon atoms, phenyl radicals, aryl radicals having from 7 to 10 carbon atoms, aralkyl radicals having from 7 to 10 carbon atoms and wherein n is 1.

15. The method of claim 1 wherein said complexing ligands are present in at least the stoichiometric amount.

* * * * *